United States Patent [19]

Gillen

[11] 4,273,204

[45] Jun. 16, 1981

[54] CAPACITIVE FORCE LOAD CELL FOR WEIGHING SCALE

[75] Inventor: Adelbert M. Gillen, Atlantic Highlands, N.J.

[73] Assignee: The Jade Corporation, Huntingdon Valley, Pa.

[21] Appl. No.: 910,804

[22] Filed: May 30, 1978

[51] Int. Cl.³ ............................................. G01G 7/00
[52] U.S. Cl. ............................. 177/210 C; 73/862.64; 177/225; 361/278; 361/283; 361/291
[58] Field of Search .......................... 177/210 C, 225; 361/283, 290, 291, 300, 278; 73/141 A

[56] References Cited

U.S. PATENT DOCUMENTS

| | | | |
|---|---|---|---|
| 1,431,638 | 10/1922 | Dowling | 177/210 C |
| 1,906,250 | 5/1933 | Devol | 361/290 X |
| 2,258,613 | 10/1941 | Kannenstine | 361/283 X |
| 2,322,681 | 6/1943 | Zenor | 361/290 X |
| 2,881,372 | 4/1959 | Dubilier | 361/278 |
| 3,172,493 | 3/1965 | Koch | 177/210 C |
| 3,314,493 | 4/1967 | Kennedy | 177/210 C |
| 3,332,506 | 7/1967 | Bradfield | 177/210 C |
| 3,565,195 | 4/1969 | Miller | 177/210 C |
| 3,635,298 | 1/1972 | Kistler | 177/210 C |
| 3,875,481 | 4/1975 | Miller | 177/210 C X |
| 3,991,840 | 11/1976 | Rawcliffe | 177/210 C |
| 3,993,939 | 11/1976 | Slavin | 361/283 |
| 4,064,550 | 12/1977 | Dias | 361/283 |

FOREIGN PATENT DOCUMENTS 1088873  10/1967  United Kingdom ............... 177/210 C

*Primary Examiner*—Joseph W. Hartary
*Attorney, Agent, or Firm*—Seidel, Gonda, Goldhammer & Panitch

[57] ABSTRACT

A weight scale includes a capacitive force load cell for linearly transducing force into electrical capacity. A C-shaped spring supports two capacitor plates adjacent the distal ends of the arms with the surfaces of the plates being normally parallel. Weight is transmitted from the platform of the scale to a pin which acts to separate the arms against the spring force. The plates are shaped, preferably triangularly, so that the change in capacitance as they separate is linear. The load cell is connected in circuit with an oscillator so that the change in capacitance is directly proportional to change in frequency as a measure of the weight of the load on the scale's platform.

14 Claims, 7 Drawing Figures

CAPACITIVE FORCE LOAD CELL FOR WEIGHING SCALE

This invention relates to a capacitive force load cell for a weighing scale. More particularly, the present invention relates to a load cell which linearly transduces force into electrical capacity which can be used as a measure of the weight applied to the platform of the scale.

An electronic scale distinguishes itself from a mechanical scale principally in the manner in which the measured weight is displayed. Typically, a mechanical scale transmits the weight of the load through a mechanical linkage, to a movable display scale which is rotated or otherwise moved against a force (spring or counterbalance) until the weight number is brought into alignment with a pointer or hairline in a window. This usually occurs when the weight or force created by the load equals the scale counterforce. Sometimes a pointer is moved relative to a fixed display scale. In an electrical scale, the weight of the load is proportionately transmitted to a transducer which converts it into a measurable electrical parameter. The resultant electrical signal is processed and the weight is electronically displayed. Such electronic scales are sometimes referred to as digital scales although for the most part it is only the display that is digital. The scale otherwise remains basically analog in nature.

Electronic scales have recently come into wide use for commercial purposes because they can also be used to perform calculating functions. Such scales can be used to display weight and also calculate sales price by multiplying measured weight times price per unit of weight.

Although used commercially, electronic scales have not found their way onto the consumer and home market for use as bathroom and kitchen scales and the like. One reason why electronic scales have not been widely introduced into the consumer market is because they are expensive to manufacture. Although some bathroom scales have recently been introduced at prices well in excess of $100.00, such scales are not truly competitive with existing mechanical bathroom scales where the bulk of the market presently sells below $40.00 retail price.

A major reason for the high sales price of electronic scales is the high cost of the force load cell which transduces the force created by the weight of the load into an electronic signal. In general, electronic scales use strain gauges which sense weight by varying resistance as a function of the amount of applied force. The problem with strain gauges is that they must be manufactured within narrow tolerances. Therefore, they tend to be priced relatively high even when manufactured in quantity. Moreover, high quality electronic amplifiers must be used to detect the signal generated by the strain gauges if a scale operable within acceptable tolerances, even for a bathroom scale, is to be produced. Thus, even with today's inexpensive microelectronic circuitry, bathroom scales are priced well above $100.00 at the retail level.

The present invention is directed to providing an inexpensive force load cell which can be used to transduce force into a measurable electronic parameter that can be readily detected, processed and displayed. More particularly, the present invention is directed to a capacitive force load cell; that is, a force load cell which transduces the load force into a change in electrical capacitance which can be readily detected, processed and displayed in units of weight.

In general, a force load cell should have certain characteristics. It should have a linear response over the entire range of force (weight) which is to be applied to it. Its electrical output as a function of the force should be repeatable over the useful life of the cell. Still further, the cell itself should be self-zeroing. In other words, it should have little or no hysteresis. If these parameters can be provided in a force load cell that is simple of construction and inexpensive to manufacture, then such a cell would be useful for electronic weighing scales.

Such a force load cell is provided in accordance with the present invention. The force load cell of the present invention comprises a pair of metallic capacitor plates which are insulatively mounted adjacent the distal end of a pair of support arms. The support arms normally hold the plates in spaced substantially parallel relation to each other to form a capacitor with an air dielectric. The support arms are joined at their opposite ends to a spring. The force created by the weight of the load on the platform of the scale is transmitted to the arms which move against the force of the spring means. This results in a change in the spacing between the capacitor plates which thus effects a change in electrical capacity. The plates are physically shaped so that the change in capacitance is linear even though the plates move out of parallelism. When the force separating the arms is relieved, the spring returns them and hence the capacitor plates to their original position.

Such a cell meets all of the characteristics described above. The arms and spring can be a single piece of C-shaped steel. The capacitive plates themselves can be made of practically any metal. The capacitor can be connected as part of the circuit of an oscillator whose frequency changes in accordance with the change in capacitance. Oscillators are inexpensive electronic devices and the need for expensive electronic amplifiers is eliminated because changes in frequency can be measured with inexpensive electronic components. Another advantage of the load cell is that it is readily used with common existing linkages for mechanical scales which ordinarily transmit the load force from the platform of the scale to the movable scale face or pointer.

For the purpose of illustrating the invention, there is shown in the drawings a form which is presently preferred; it being understood, however, that this invention is not limited to the precise arrangements and instrumentalities shown.

Figure 1:
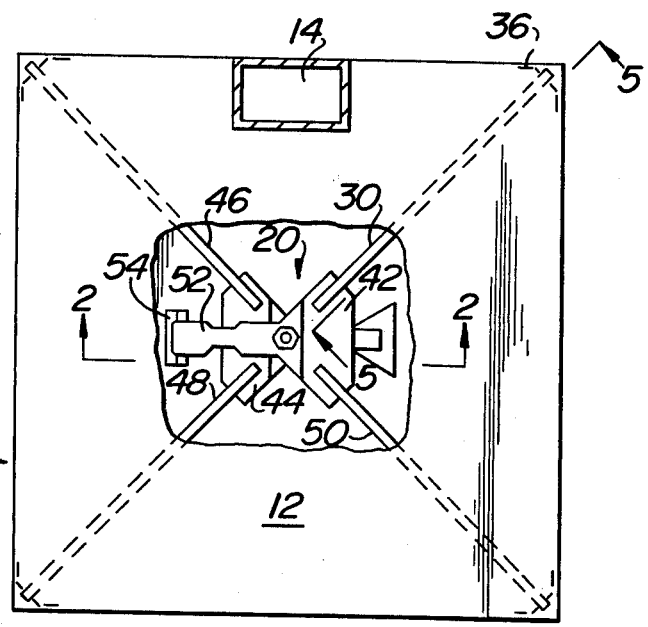
FIG. 1 is a top plan view of platform (partially cutaway) of a bathroom scale constructed for use with the capacitive force load cell of the present invention.

Referring to the drawings in detail, wherein like numerals indicate like elements, there is shown in FIG. 1 a weighing scale designated generally by the numeral 10. The scale is shown in the configuration of a bathroom scale, although it should be understood that the capacitive force load cell described herein can be used within scales having other configurations and other uses, such as kitchen scales for weighing food.

As shown, the scale 10 includes a platform 12 upon which the load to be weighed may be supported. In the case of a bathroom scale, the load would normally be a person standing on the platform. The platform is supported on a mechanism 20 for transmitting the force developed by the load to the load cell in a manner to be described hereinafter. At the top of the platform, there is provided a window 14 in which the weight of the load may be displayed. Such display is preferably made by the use of light emitting diodes or liquid crystal display for representing the digits.

Figure 2:
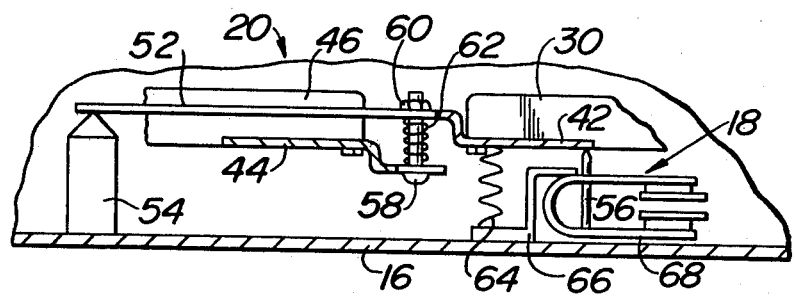
FIG. 2 is a section of the force load cell taken in elevation along the line 2—2 in FIG. 1.

As shown in FIG. 2, the weighing scale 10 also includes a base 16 upon which is supported the load force transmitting means as well as the capacitive force load cell 18.

The means for transmitting the force developed by the load to the capacitive force load cell is shown through the cut-away portion of the platform 12 in FIG. 1 and in elevation in FIG. 2. In both figures, it is indicated generally by the numeral 20. The force transmitting means 20 is conventional and has previously been used in scales for the purpose of transmitting the load force to the mechanism for operating the mechanical scale or pointer. Its advantage is that it reasonably accurately transmits the force even though the load is not evenly distributed on the platform scale. The force transmitting means 20 has been modified somewhat for use with the capacitive force load cell. In particular, the force developed by the weight of the load is brought to a single point for application to the capacitive force load cell. Other means could be used.

Referring to FIGS. 1, 2, 5 and 6, the mechanism of the force transmitting means 20 supports the platform 12 in each of the corners of the weighing scale 10. Since the support is the same in each of the corners, only one is shown in each of FIGS. 5 and 6. A U-shaped member 22 is fixed to the bottom of the platform 12 by a weld (as shown), rivet or other conventional fastener. The U-shaped member provides two arms supporting a cross arm 24 which has an inverted and truncated V relief section 26 formed in its lower edge. The apex of the V section 26 rests in a V section 28 formed in the beam 30. A notch 32 in the lower edge of the beam 30 is positioned outwardly of the point of engagement between the cross arm 24 and the V section 28. The notch 32 engages the beam 30 within a notch 34 in the upper edge of the upright 36. This forms the fulcrum of the beam 30. The free end of the beam 30 is provided with a pair of tabs 38 and 40 which permit it to be engaged with the plate 42 by inserting the tabs into holes formed within the surface of the plate. This form of engagement permits the beam to be displaced by the load force while still remaining engaged with the plate 42.

Figure 5:
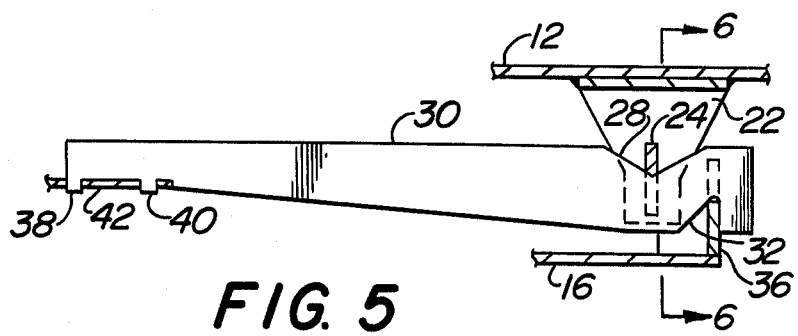
FIG. 5 is a partial sectional view showing the linkage for transmitting the load force to the force load cell.
Figure 6:
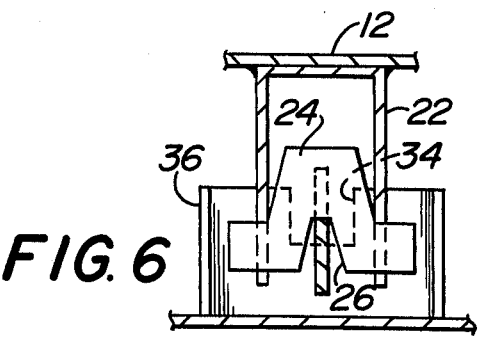
FIG. 6 is a transverse sectional view of the linkage illustrated in FIG. 5 taken along the line 6—6.

As best shown in FIG. 1, the scale includes three additional beams 46, 48 and 50, all mechanically interconnected with the platform by the same mechanism shown in FIGS. 5 and 6. The beam 50 is connected to the plate 42. However, the beams 46 and 48 are connected to the plate 44 as shown in FIG. 1. The manner of connection is the same as described in respect to beam 30.

The forces applied by the load to the platform 12 are transmitted by the U members 22 to each of their respective cross arms 24. These forces now press downwardly against the beams 30, 44, 46 and 50 which tend to pivot about their respective fulcrum, as provided by the upright 36 and notch 32. Thus, the force is transmitted along the beams and applied to the plates 42 and 44.

The plate 42 includes an integral arm 52 which extends outwardly and rests upon the knife edge formed at the top of the post 54 fixed to the base 16. The knife edge of the post 54 is positioned closely adjacent to the distal end of the extension arm 52. The opposite edge of the plate 42 rests upon the apex of a pin 56 which is fixed to the lowermost arm of the capacitive load cell 18 as explained hereinafter. In this manner, the post 54 and pin 56 support the entire central portion of the force transmitting means including the plate 44 which is connected to the beams 46 and 48. The plate 44 is loosely connected below the plate 42 by a headed pin 58 which extends through an opening in plate 42 and is held in position by the nut 60 threaded to its uppermost end. The plates 42 and 44 are maintained in spaced apart relation by the spring 62. Since the plate 44 is below the plate 42, the downward forces transmitted to it by its respective beams 46 and 48 are transmitted through the headed pin 58 to the plate 42. Thus, all forces developed by a load applied to the platform 12 are ultimately transmitted to the plate 42 which rests upon the post 54 and pin 56.

The plate 42 is held in position on the post 54 and pin 56 by the spring 64 connected to it and to the bracket 66 which is fixed to the base 16. The bracket 66 supports the capacitive force load cell 18 above the base 16. In particular, it is connected by a weld or similar attachment means to the support 68 for the capacitor plates 70 and 72. The plates 70 and 72 are insulatively fixed to the support 68. By way of example, the capacitor plates 70 and 72 may be connected to the support 68 by an epoxy resin and glass insulators 74 and 76.

Figure 3:
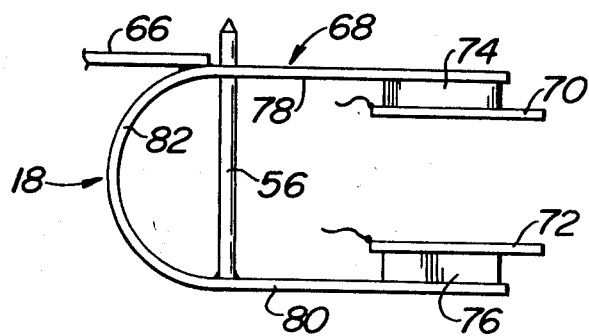
FIG. 3 is a side elevational view showing the force load cell of the present invention.

As shown in FIG. 3, the support 68 includes a pair of arms 78 and 80 which are integrally connected by a portion 82 which forms the bight of a C-shaped support. The arms 78 and 80 support the capacitor plates 70 and 72 adjacent their distal end. The support 68 is preferably made of heat tempered steel or spring steel. Heat tempered cold rolled steel may be chosen because it is relatively inexpensive and easy to use in manufacturing processes. If desired, the support 68 need not be manufactured as a single C-shaped piece. For example, the bight shaped portion 82 could be separate spring individually connected to the arms 78 and 80. Other configurations could be used so that capacitor plates 70 and 72 are mounted to separate when a force is applied against a spring member which will draw them back into their normal position when the force is relieved.

The plates 70 and 72 are mounted so as to be parallel to each other when no load is on the platform 12 of the scale 10. The air between the plates 70 and 72 provides the dielectric, and the spacing between the plates may, by way of example, be 0.005 inch. For ease of illustration, the spacing between the plates 70 and 72 has been greatly exaggerated in the drawings.

The pin 56 is fixed only to the arm 80. It extends upwardly through a hole in the arm 78 but is not fixed to it. Arm 78 is, however, fixed to bracket 66 as shown. When a force is applied to the pin 56 by plate 42, it forces arm 80 to move away from arm 78 which is fixed in position by the bracket 66. This results in a separation of the plates 70 and 72 thereby increasing the spacing between them. The capacitance of an electrical capacitor is directly proportional to the spacing between its plates. Thus, this change in spacing changes the electrical capacitance of the capacitor formed by the plates 70 and 72 and it is directly proportional to the force applied by the pin 56. From what has been described hereinbefore, the force applied by the pin 56 is directly proportional to the weight of the load on the platform 12.

A unique advantage of the present invention is that only a single force is transmitted to the capacitive force load cell 18 through the pin 56. The spacing between the plates 70 and 72 is allowed to become non-parallel when forced apart. This is advantageous because mechanical mechanisms for separating the plates 70 and 72 while maintaining their surfaces parallel to each other require two force applying mechanisms which are complex and therefore make the weighing scale 10 more expensive to manufacture.

Figure 4:
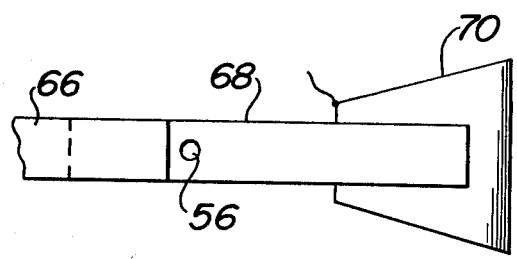
FIG. 4 is a top plan view of the load cell illustrated in FIG. 3.

The disadvantage of allowing the plates to become non-parallel is the resultant non-linearity of the change in capacitance. By way of example, at maximum load, the spacing may vary from 0.005" to 0.050". This, however, can be compensated for over the range of the scale of properly shaping the plates. As shown in FIG. 4, each of the plates is triangular in shape; more particularly a truncated triangle with the apex of the triangle being positioned inwardly from the distal end of the arms 78 and 80 adjacent to which the plates 70 and 72 are mounted. As the arms 78 and 80 separate by the application of a force through the pin 56, the apices of the triangular plates 70 and 72 remain closely spaced together at their initial spacing while the bases of the triangle are at the widest spacing. However, the triangular shape compensates for the variation in spacing along the height of the triangle since the area of the plates also affects its capacitance. Thus, by positioning maximum area adjacent maximum spacing between the plates, the change in capacitance is linearly proportional to the force applied to the pin 56 even though the plates are displaced out of parallel with each other.

It should be understood that a reversal of parts is entirely possible. Thus, the arms 78 and 80 could be forced toward each other. In this case, the plates 70 and 72 should be reversed with the apices at the outermost end.

The spring force created by the support 68 returns the plates to their normal parallel position when the force applied to the pin 56 is relieved. This provides automatic and simple self-zeroing of the scale. The hysteresis of the spring is negligible.

Figure 7:
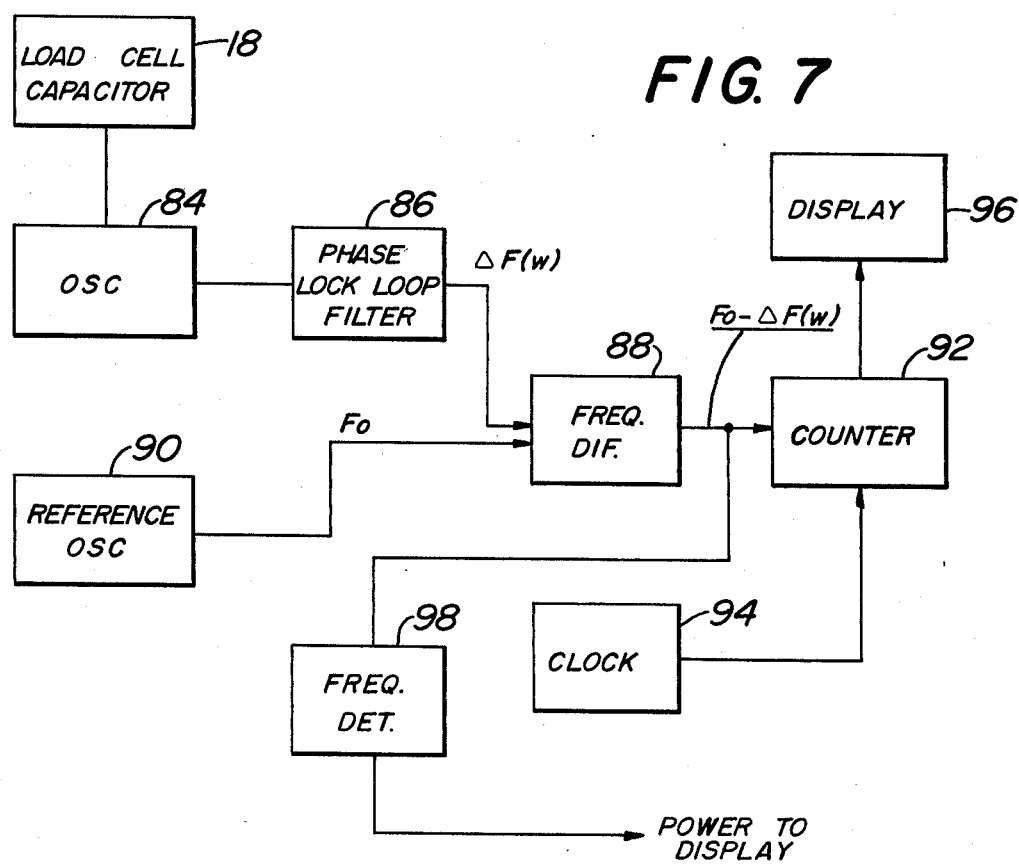
FIG. 7 is a schematic block diagram of an electronic circuit for use with the capacitive force load cell of the present invention.

Referring now to FIG. 7, there is shown an electronic circuit which may be used in conjunction with the capacitive force load cell 18. The capacitor formed by the plates 70 and 72 is connected by electrical wires (see FIG. 3) to an oscillator 84. More particularly, the capacitor may be connected in the tank circuit of the oscillator so that the changes in capacitance result in a change in the output frequency of the oscillator. The output of the oscillator 84 is connected to a phase lock loop filter 86 which in turn is connected to the frequency difference circuit 88. A reference oscillator 90 generates a fixed frequency which also is connected to the frequency difference circuit 88. In a conventional manner, the output of the frequency difference circuit 88 is a frequency which is either the sum or the difference of the output of the oscillators 84 and 90 ($F_0-F_{(w)}$). The number of cycles in the frequency received from the frequency difference circuit 88 is counted in the counter 92 which is also provided with a timing base by the clock 94. The output of the counter 92 may be displayed by an LED or LCD display 96. It is understood that appropriate BCD circuits and drivers for the display are also provided. Since such circuitry is conventional, it has not been described. The function of the clock 94 is to provide a time base so that the frequency counted by the counter 92 is in the correct unit of measurement (e.g., pounds, ounces, kilograms).

Since it is desirable that the power for the electronic circuit be provided by batteries, it is also necessary to minimize the drain on the batteries by the display. The provision of an on/off switch for a bathroom scale is not a desirable feature. To eliminate the necessity for such a switch, the circuit shown in FIG. 7 provides the frequency detector 98. Detector 98 detects the presence of a frequency at the output of the frequency difference circuit 88. The circuit generates a signal which can be used to turn on the power to the display. Power to the display is controlled because that is the major drain upon the batteries. The remaining electronic circuitry has negligible power drain upon the batteries.

The present invention may be embodied in other specific forms without departing from the spirit or essential attributes thereof and, accordingly, reference should be made to the appended claims, rather than to the foregoing specification as indicating the scope of the invention.

What is claimed is:

1. A capacitive force load cell for linearly transducing force into electrical capacity, comprising:
    (a) a pair of metallic plates;
    (b) said plates being insulatively mounted on a support to form a capacitor;
    (c) said support including arm means supporting one end of said plates so that at least one of said plates has a free distal end, said arm means being joined to spring means holding said plates in their initial spaced relation to each other;
    (d) means for transmitting a load force proportional to weight to said support for changing the spacing between facing surfaces of said plates with maximum change of spacing being at said distal end of at least one plate in response to the applied force thereby changing the electrical capacity of the capacitor formed by said plate;
    (e) said plates having a physical shape such that the change in electrical capacitance is linearly proportional to the load force applied to the support when the facing surfaces of the plates are displaced out of their initial spaced relation by the force applied to the support.

2. A capacitive force load cell for linearly transducing force into electrical capacity in accordance with claim 1 wherein only one force is applied to the support.

3. A capacitance force load cell in accordance with claim 2 wherein said plates are substantially triangularly shaped.

4. A capacitive force load cell in accordance with claim 2 wherein said plates are non-circular in shape.

5. A capacitive force load cell in accordance with claim 1 wherein said support arms and said spring means are a unitary C-shaped spring.

6. A capacitive force load cell for linearly transducing force into electrical capacity, comprising:
   (a) a pair of metallic plates;
   (b) said plates being insulatively mounted adjacent the distal end of a pair of support arms to form a capacitor, said support arms normally hold the plates in spaced substantially parallel relation to each other when no load is applied to the support arms and out of parallel relation when displaced by a load applied to said support arms;
   (c) said support arms being joined adjacent their opposite ends to spring means;
   (d) means for transmitting a load force to displace the support arms against the force of said spring means for effecting a change in the spacing between facing surfaces of said plates to thus change the electrical capacity of the capacitor formed by said plates;
   (e) said plates having a physical shape such that the change in electrical capacitance is linearly proportional to the load force when the facing surfaces of the plates are displaced out of parallel relation by the displacement of the support arm.

7. A capacitive force load cell in accordance with claim 6 wherein said support arms and said spring means are a unitary C-shaped spring.

8. A capacitive force load cell in accordance with claim 7 wherein said plates are substantially triangular in shape, and said plates are mounted on said arms with the base of the triangle positioned at the point of maximum change in spacing between the plates upon the application of a load force.

9. A capacitive force load cell in accordance with claim 6 wherein said plates are substantially triangular in shape, and said plates are mounted on said arms with the base of the triangle positioned at the point of maximum change in spacing between the plates upon the application of the load force.

10. A capacitive force load cell in accordance with claim 6 wherein the cell is connected in circuit with an oscillator whose output is a frequency directly proportional to the capacitance of said load cell, a reference oscillator, means for measuring the difference in frequency between the output of said reference oscillator and said first oscillator, and means for converting said frequency to units of force, and means for displaying said force.

11. In a weight measuring scale, comprising:
   (a) a platform for supporting a load whose weight is to be measured;
   (b) means for transmitting the load from the platform to a load cell;
   (c) the improvement comprising a capacitive force load cell for linearly transducing force into electrical capacity, comprising:
      (i) a pair of metallic plates;
      (ii) said plates being insulatively mounted adjacent the distal end of a pair of support arms to form a capacitor, said support arms normally hold the plates in spaced substantially parallel relation to each other when no load is applied to the platform and out of parallel relation when displaced by a load applied to said platform;
      (iii) said support arms being joined adjacent their opposite ends to spring means;
      (iv) means for transmitting a load force to displace the support arms against the force of said spring means for effecting a change in the spacing between facing surfaces of said plates to thus change the electrical capacity of the capacitor formed by said plates;
      (v) said plates having a physical shape such that the change in electrical capacitance is linearly proportional to the load force when the facing surfaces of the plates are displaced out of parallel relation by the displacement of the support arms.

12. In a weight measuring scale in accordance with claim 11 wherein said support arms and said spring means are a unitary C-shaped spring.

13. In a weight measuring scale in accordance with claim 12 wherein said plates are substantially triangular in shape, and said plates are mounted on said arms with the base of the triangle positioned at the point of maximum change in spacing between the plates upon the application of a load force.

14. In a weight measuring scale in accordance with claim 11 wherein said plates are substantially triangular in shape, and said plates are mounted on said arms with the base of the triangle positioned at the point of maximum change in spacing between the plates upon the application of the load force.

* * * * *